(12) United States Patent
Nanda

(10) Patent No.: US 8,407,191 B1
(45) Date of Patent: Mar. 26, 2013

(54) PRIORITY BASED DATA SCRUBBING ON A DEDUPLICATED DATA STORE

(75) Inventor: Kumari Bijayalaxmi Nanda, Iselin, NJ (US)

(73) Assignee: EMC Corporation, Hopkinton, MA (US)

( * ) Notice: Subject to any disclaimer, the term of this patent is extended or adjusted under 35 U.S.C. 154(b) by 226 days.

(21) Appl. No.: 12/826,131

(22) Filed: Jun. 29, 2010

(51) Int. Cl.
G06F 17/30 (2006.01)

(52) U.S. Cl. .................. 707/692; 707/654; 707/687

(58) Field of Classification Search ............. 707/654, 707/687, 692
See application file for complete search history.

(56) References Cited

U.S. PATENT DOCUMENTS

| | | | |
|---|---|---|---|
| 5,632,012 A | 5/1997 | Belsan et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 5,893,140 A | 4/1999 | Vahalia et al. | |
| 5,933,603 A | 8/1999 | Vahalia et al. | |
| 6,145,012 A | 11/2000 | Small | |
| 6,389,433 B1 | 5/2002 | Bolosky et al. | |
| 6,477,544 B1 | 11/2002 | Bolosky et al. | |
| 6,487,562 B1 | 11/2002 | Mason, Jr. et al. | |
| 6,529,909 B1 | 3/2003 | Bowman-Amuah | |
| 6,665,740 B1 | 12/2003 | Mason, Jr. et al. | |
| 6,754,897 B1 | 6/2004 | Ofer et al. | |
| 6,851,070 B1 | 2/2005 | Rodrigues et al. | |
| 6,904,470 B1 | 6/2005 | Ofer et al. | |
| 7,409,687 B2 | 8/2008 | Ofer et al. | |
| 7,434,012 B1 * | 10/2008 | Ives et al. ................. | 711/159 |
| 7,707,165 B1 | 4/2010 | Jiang et al. | |
| 7,913,114 B2 * | 3/2011 | Leppard ................. | 714/15 |
| 2002/0129277 A1 | 9/2002 | Caccavale | |
| 2003/0023808 A1 | 1/2003 | Bakke et al. | |
| 2005/0028048 A1 * | 2/2005 | New et al. ............... | 714/54 |
| 2005/0065986 A1 | 3/2005 | Bixby et al. | |
| 2005/0091215 A1 * | 4/2005 | Chandra et al. ......... | 707/10 |
| 2006/0218199 A1 * | 9/2006 | Kishi ........................ | 707/200 |
| 2008/0034268 A1 | 2/2008 | Dodd et al. | |
| 2009/0070647 A1 * | 3/2009 | Allison et al. .......... | 714/746 |
| 2009/0070648 A1 * | 3/2009 | Allison et al. .......... | 714/746 |
| 2009/0240694 A1 * | 9/2009 | Jensen et al. ............ | 707/6 |
| 2009/0319534 A1 | 12/2009 | Gokhale | |
| 2010/0049735 A1 * | 2/2010 | Hsu .......................... | 707/103 R |

OTHER PUBLICATIONS

Article entitled "Data Invulnerability Architecture", by Data Domain, Copyright 2008.*

(Continued)

*Primary Examiner* — Mahesh Dwivedi

(74) *Attorney, Agent, or Firm* — Richard Auchterlonie; Novak Druce Connolly Bove + Quigg LLP

(57) ABSTRACT

Deduplicated data objects are scrubbed by a executing a priority scrubbing task that scans the deduplicated data objects and applies a condition that enables priority data scrubbing based on the value of at least one attribute of the de-duplicated data objects. For example, a low priority task scrubs a deduplicated data object when a reference count of the deduplicated object reaches a threshold. A high priority task scrubs a deduplicated data object when a priority attribute indicates that the deduplicated data object is used by a critical source data object. A medium priority task scrubs a deduplicated data object when the access frequency of the deduplicated data object reaches a threshold. The condition may encode a scrubbing policy or heuristic, and may trigger further action in addition to scrubbing, such as triggering an update of the access rate.

3 Claims, 9 Drawing Sheets

OTHER PUBLICATIONS

Uresh Vahalia, Unix Internals: The New Frontiers, Chapter 9, "File System Implementations," and Chapter 11, Advanced File Systems, 1996, p. 261-289, 338-371, Prentice-Hall, Inc., Upper Saddle River, New Jersey. "Celerra File Server Architecture for High Availability," Aug. 1999, 11 pages, EMC Corporation, Hopkinton, Mass.

"Celerra File Server in the E-Infostructure," 2000, 12 pages, EMC Corporation, Hopkinton, Mass.

"Enginuity: The Symmetrix Storage Operating Environment," EMC White Paper, Jul. 2005, 21 pages, EMC Corporation, Hopkinton, Mass.

Dubois, Laura, and Amatrude, Robert, "Backup and Recovery: Accelerating Efficiency and Driving Down IT Costs Using Data Deduplication," Feb. 2010,16 pages, IDC.com, Framingham, MA.

Bolowsky, William J., "Single Instance Storage in Windows® 2000," USENIX Technical Program, WinsSys, Aug. 3-4, 2000, Seattle, WA, 12 pages, USENIX, Berkeley, CA.

FIPS Publication 198, The Keyed-Hash Message Authentication Code (HMAC), Mar. 6, 2002, National Institute of Standards and Technology, Gaithersburg, MD.

Babineau, Brian, "Symantec Enterprise Vault and EMC Centera—Unlocking the Benefits of Efficient Information Archiving," Jan. 2007, 11 pages, Enterprise Strategy Group, Milford, MA.

Baltazar, Henry, "Microsoft's Single Instance Storage vs. Deduplication," Inside eWEEK Labs, eweek.com, Ziff Davis Internet, Woburn, MA Jan. 25, 2006, 3 pages.

Wendt, Jerome M., "Tech Report: Content-addressed storage preferred for fixed-content storage," Jun. 19, 2006, 5 pages, searchstorage.com, Needham, MA.

"Single Instance Store and SIS Backup," msdn2.microsoft.com, printed Jan. 25, 2007, 8 pages, Microsoft Corporation, Redmond, WA.

"EMC Symmetrix DMX Architecture," Product Description Guide, Mar. 2004, 76 pages, EMC Corporation, Hopkinton, MA.

"Information Lifecycle Management: An Automated Approach," Technical White Paper, Dec. 8, 2003, 20 pages, EMC Corporation, Hopkinton, MA.

"Automated Resource Management," Technology Brief—Aug. 2002, 3 pages, The Enterprise Storage Group, Milford, MA.

"Enginuity: The Symmetrix Storage Operating Environment," EMC White Paper, May 2010, 27 pages, EMC Corporation, Hopkinton, MA.

"EMC Data Domain Global DeDuplication Array," Data Sheet, May 2010, 3 pages, EMC Corporation, Hopkinton, MA.

Symmetrix 3000 and 5000 Enterprise Storage Systems Product Description Guide, Feb. 1999, 34 pages, EMC Corporation, Hopkinton, MA.

Efficient Data Protection with EMC Avamar Global Deduplication Software, White Paper, Jan. 2010, 19 pages, EMC Corporation, Hopkinton, MA.

\* cited by examiner

PRIORITY BASED DATA SCRUBBING ON A DEDUPLICATED DATA STORE

FIELD OF THE INVENTION

The present invention relates to data scrubbing in a storage server having a deduplicated data store.

BACKGROUND OF THE INVENTION

Data scrubbing is a process of accessing data in a memory or storage location to ensure that the data will be accessible later when needed. For a high level of data protection, the data is stored in memory or storage using error detection and correction coding or redundant storage array (RAID) techniques so that most data errors are detected and corrected automatically when the data is accessed during scrubbing. For example, in a data storage system, cache memory and disk storage are scrubbed periodically or during idle time to prevent data loss while minimizing performance loss and impact of any failure.

In the data storage system, a maintenance procedure periodically reads and rewrites all areas of memory to detect potential errors, and maintains a record of errors for each memory segment. Any small "soft" errors are detected and corrected, while the potential for larger "hard" errors is dramatically reduced. If a predetermined error threshold is reached in a certain segment, or a permanent error is confirmed, the maintenance procedure moves that memory content to another area in memory and the failed component is removed from service, or "fenced."

In the data storage system, the maintenance procedure also scrubs all data blocks on the disk drives. During a production lull, the maintenance procedure reads and rewrites all blocks on all tracks on all physical disks and then checks for errors or inconsistencies. Bad sectors are fenced off. If the problem is significant, usable data is copied off the failing disk and the failing disk is taken out of service.

Deduplication is a technology that normalizes duplicate data to a single shared data object to achieve storage capacity efficiency. A data deduplication procedure searches for duplicate data and discards the duplicate data when located. When duplicate data is detected, it is not retained; instead, a "data pointer" is modified so that the storage system references an exact copy of the data already stored on disk. In this fashion, multiple source data objects such as files may share de-duplicated data objects such as data blocks or segments of data blocks. This reduces the storage requirements and also improves backup and recovery efficiency.

Data compression upon the deduplicated data objects can further reduce the storage requirements. Data compression is the encoding of data to reduce its storage requirements. Data compression is optimized for a single data object and reduces its footprint, while deduplication works across data objects.

In a deduplicated data store, all of the deduplicated data objects have been data scrubbed either periodically or not at all.

SUMMARY OF THE INVENTION

The present invention recognizes that it is desirable to scrub deduplicated data objects but there are problems with periodic scrubbing of all of the deduplicated data objects in a data duplication store. Scrubbing all data periodically with low priority so as not to affect the data injection rates can delay data scrubbing for a single critical data object by multiple days. And with more and more new data coming in continually throughout a 24 hour period from different back offices, there may be only a very small window when the resources can be used for scrubbing.

The present invention further recognizes that blanket scrubbing methods are not appropriate for a deduplicated data store in which deduplicated data objects are shared among source data objects. In addition, in an effort to add storage to existing data centers having limited physical floor space, system administrators have been migrating data from various services to a single deduplicated data store. Therefore a single deduplicated data object may be shared among source data objects from critical and non-critical services.

In some cases, an appropriate scrubbing method should recognize whether or not a deduplicated data object is shared by multiple source data objects or by a critical service so that the scrubbing method may detect and correct errors in shared or critical data on a priority basis before accumulated errors make rapid automatic error correction impossible. In other cases, an appropriate scrubbing method should recognize whether or not a deduplicated data object is being frequently accessed because more frequently accessed data is likely to be more valuable than less frequently accessed data. All of these cases can be handled by applying a condition encoding a policy or heuristic based on one or more attributes of the deduplicated data objects to enable priority based data scrubbing.

The priority based data scrubbing detects and corrects any failures in critical deduplicated data objects much earlier than periodic or background scrubbing of all of the deduplicated data objects. The priority based data scrubbing is a proactive approach that provides value for business by earlier failure detection and correction and by resource savings for the data scrubbing. Only the critical data, which may not be more than about 10 to 20%, need be scrubbed on a priority basis, and the less valuable data can be scrubbed rarely or not at all.

In accordance with one aspect, the invention provides a computer-implemented method of ensuring access to data stored in a deduplicated data store. The deduplicated data store includes data storage storing deduplicated data objects and pointers to the deduplicated data objects for source data objects for sharing of the deduplicated data objects among the source data objects. The data storage also stores attributes of the deduplicated data objects. The method includes a data processor executing computer instructions stored on a non-transitory computer-readable storage medium to perform the steps of programming the data processor with a condition for enabling priority data scrubbing based on the value of at least one attribute of the de-duplicated data objects; and scanning the stored attributes of the deduplicated data objects while applying the condition to the value of the at least one attribute for each of the deduplicated data objects, and when the scanning of the stored attributes finds that the condition is satisfied for the value of said at least one attribute of at least one of the deduplicated data objects, performing a priority data scrubbing operation upon the at least one of the deduplicated data objects.

In accordance with another aspect, the invention provides a storage system including a deduplicated data store, a data processor, and a non-transitory computer readable storage medium. The deduplicated data store includes data storage storing deduplicated data objects and pointers to the deduplicated data objects for source data objects for sharing of the deduplicated data objects among the source data objects. The data storage also stores attributes of the deduplicated data objects. The data processor is coupled to the data storage for reading the deduplicated data objects and reading the attributes of the deduplicated data objects. The non-transitory computer-readable storage medium stores computer instructions that, when executed by the data processor, perform the steps of programming the data processor with a condition for enabling priority data scrubbing based on the value of at least one attribute of the de-duplicated data objects; and scanning the stored attributes of the deduplicated data objects while applying the condition to the value of the at least one attribute for each of the deduplicated data objects, and when the scanning of the stored attributes finds that the condition is satisfied for the value of the at least one attribute of at least one of the deduplicated data objects, performing a priority data scrubbing operation upon the at least one of the deduplicated data objects.

In accordance with a final aspect, the invention provides a non-transitory computer-readable storage medium storing computer instructions that, when executed by a data processor, perform data scrubbing of deduplicated data objects in a data store by the steps of programming the data processor with a condition for enabling priority data scrubbing based on the value of at least one attribute of the de-duplicated data objects; and scanning stored attributes of the deduplicated data objects while applying the condition to the value of the at least one attribute for each of the deduplicated data objects, and when the scanning of the stored attributes finds that the condition is satisfied for the value of the at least one attribute of at least one of the deduplicated data objects, performing a priority data scrubbing operation upon the at least one of the deduplicated data objects.

BRIEF DESCRIPTION OF THE DRAWINGS

Additional features and advantages of the invention will be described below with reference to the drawings, in which.

Figure 1:
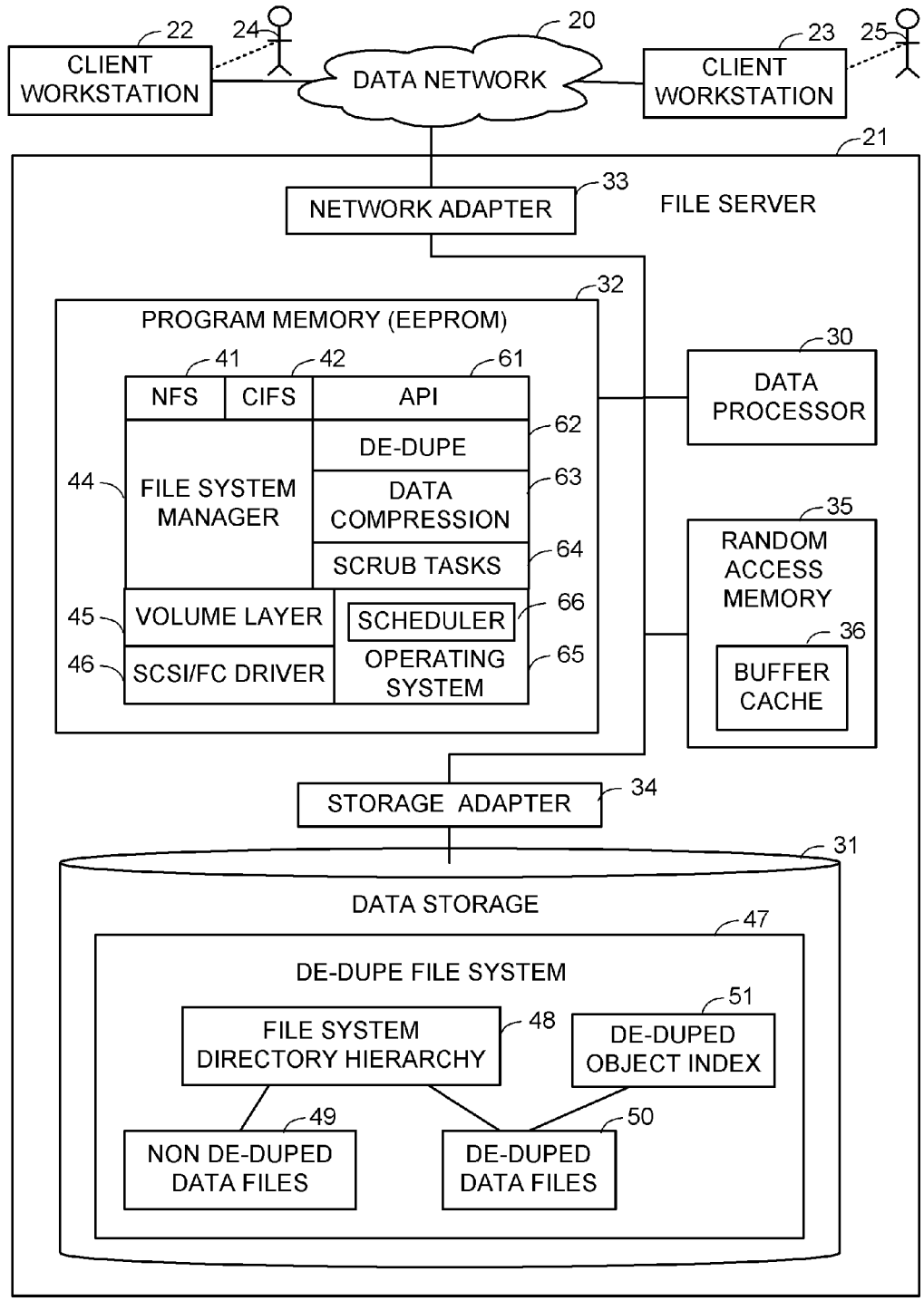
FIG. 1 is block diagram of a data network including a file server having a deduplicated data store.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data network 20 including a file server 21 servicing client workstations 22, 23 operated by human users 24, 25. The file server includes a network adapter 33 linking the file server 21 to the data network 20, and a data processor 30 coupled to the network adapter 33 and programmed for responding to client requests for access to files in data storage 31. The data processor 30 is a general purpose digital computer data processor including one or more core central processing units (CPUs) for executing computer program instructions stored in a program memory 32.

The program memory 32 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The program memory 32 stores an operating system program 65 and various other programs executed under control of the operating system program. The operating system 65 includes a task scheduler 66 for scheduling tasks of different priority. The task scheduler 66 may schedule real-time (RT) tasks and also general purpose (GP) tasks programmed as code threads. The task scheduler 66, for example, maintains application timers, and schedules execution and context switching between real-time (RT) and general purpose (GP) code threads. A suitable task scheduler is shown and described in FIG. 7 and columns 11 to 13 of Vahalia et al. U.S. Pat. No. 5,933,603 issued Aug. 3, 1999, incorporated herein by reference.

The other programs executed under control of the operating system 65 include a Network File System (NFS) module 41, a Common Internet File System (CIFS) module 42, and an application program interface (API) module 61. The NFS module 41 recognizes file access commands received by the network adapter 33 from the client workstations 22, 23 in accordance with the NFS protocol. The CIFS module 54 recognizes file access commands received by the network adapter 33 from the client workstations 22, 23 in accordance with the CIFS protocol. For example, network clients such as UNIX (Trademark) workstations may use the Network File System (NFS) protocol to access files in the data storage 31, and network clients such as Microsoft Windows (Trademark) workstations may use the Common Internet File System (CIFS) protocol to access files in the primary data storage 31.

The application program interface (API) module 61 recognizes additional file access commands which may extend the functionality of the NFS and CIFS protocols. For example, if the NFS module 41 or the CIFS module 42 receives a file access request including an operation code that is not in accordance with the NFS or CIFS protocol, then the NFS module 41 or the CIFS module 42 will invoke the API module 61 in an attempt to execute the operation or function. The API module 61 may also respond to remote procedure calls from network clients in accordance with other network protocols, such as the Simple Network Management Protocol (SNMP) or the Hypertext Transfer Protocol (HTTP).

The file system manager 44 manages hierarchical file systems in the data storage 31. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 44 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The data processor 30 is also programmed with a de-duplication facility 62, a data compression facility 63, and scrubbing tasks 64. The data processor 50 is further programmed with a volume layer 45 for organizing the data storage 31 into logical volumes of data blocks, and a Small Computer System Interface (SCSI) or Fibre Channel (FC) driver 46 for linking the volume layer 56 to the data storage 31 through a storage adapter 34.

As further shown in FIG. 1, the data storage 31 is organized as a deduplicated data store by storing a deduplicated file system 47 includes a file system directory hierarchy 48, non de-duped data files 49, de-duped data files 50, and a de-duped object index 51. The non de-duped files 49 do not share indirect blocks or data blocks of the data storage. Each of the de-duped files 50 will share the indirect blocks and data blocks of any other de-duped files that contain all of the same file data. The de-duped object index 88 provides a way of quickly determining whether or not a given one of the non de-duped files 49 contains all of the same file data as at least one of the de-duped data files 50. For example, the de-duped object index 51 includes a list of hash values associated with each disjoint set of data blocks of any of the de-duped data files. For each hash value, the de-duped object index 88 includes a respective pointer to each disjoint set of data blocks associated with the hash value, and a reference count associated with that disjoint set of data blocks. The reference count indicates the number of de-duped data files 50 that share the disjoint set of data blocks.

Figure 2:
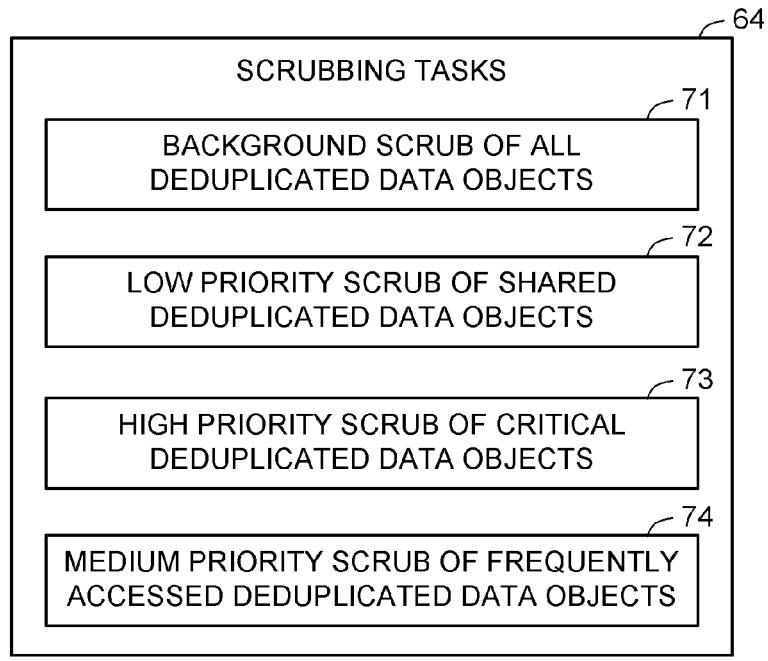
FIG. 2 is a block diagram of data scrubbing tasks in the file server of FIG. 1.

FIG. 2 shows that the scrubbing tasks 64 include a background scrub 71 of all of the deduplicated data objects, a low priority scrub of shared deduplicated data objects 72 cycling at a relatively low rate, a high priority scrub of critical deduplicated data objects 73 cycling at a relatively high rate, and a medium priority scrub of frequently accessed deduplicated data objects cycling at a medium rate between the relatively high rate and the relatively low rate.

Figure 3:
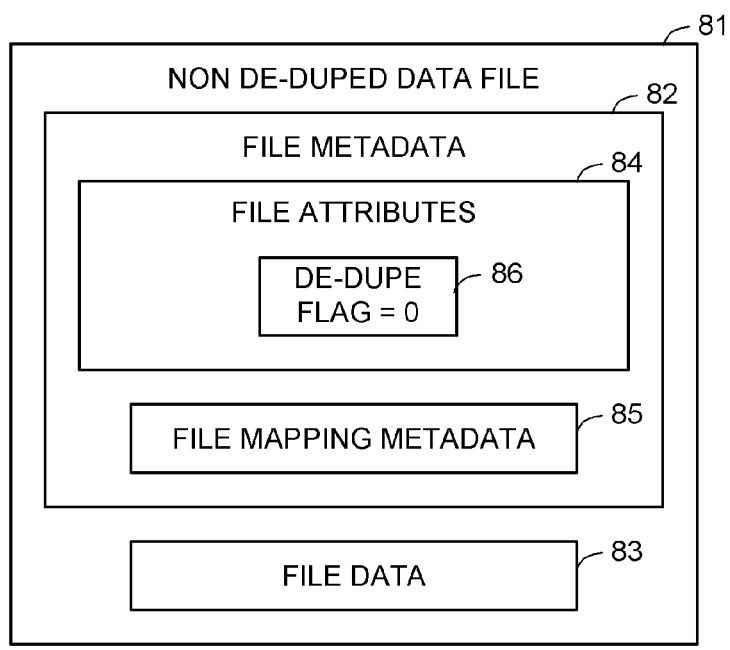
FIG. 3 is a block diagram of a non de-duped data file in storage of the primary file server of FIG. 2 or in storage of the secondary file server of FIG. 3.

FIG. 3 shows a non de-duped data file 81. The non de-duped data file has a conventional organization, including file metadata 82 and file data 83. The file metadata 82 includes file attributes 84 and file mapping metadata 85. The file attributes 84 include a de-dupe flag 86 set to zero to indicate that the file has not yet been de-duplicated.

Figure 4:
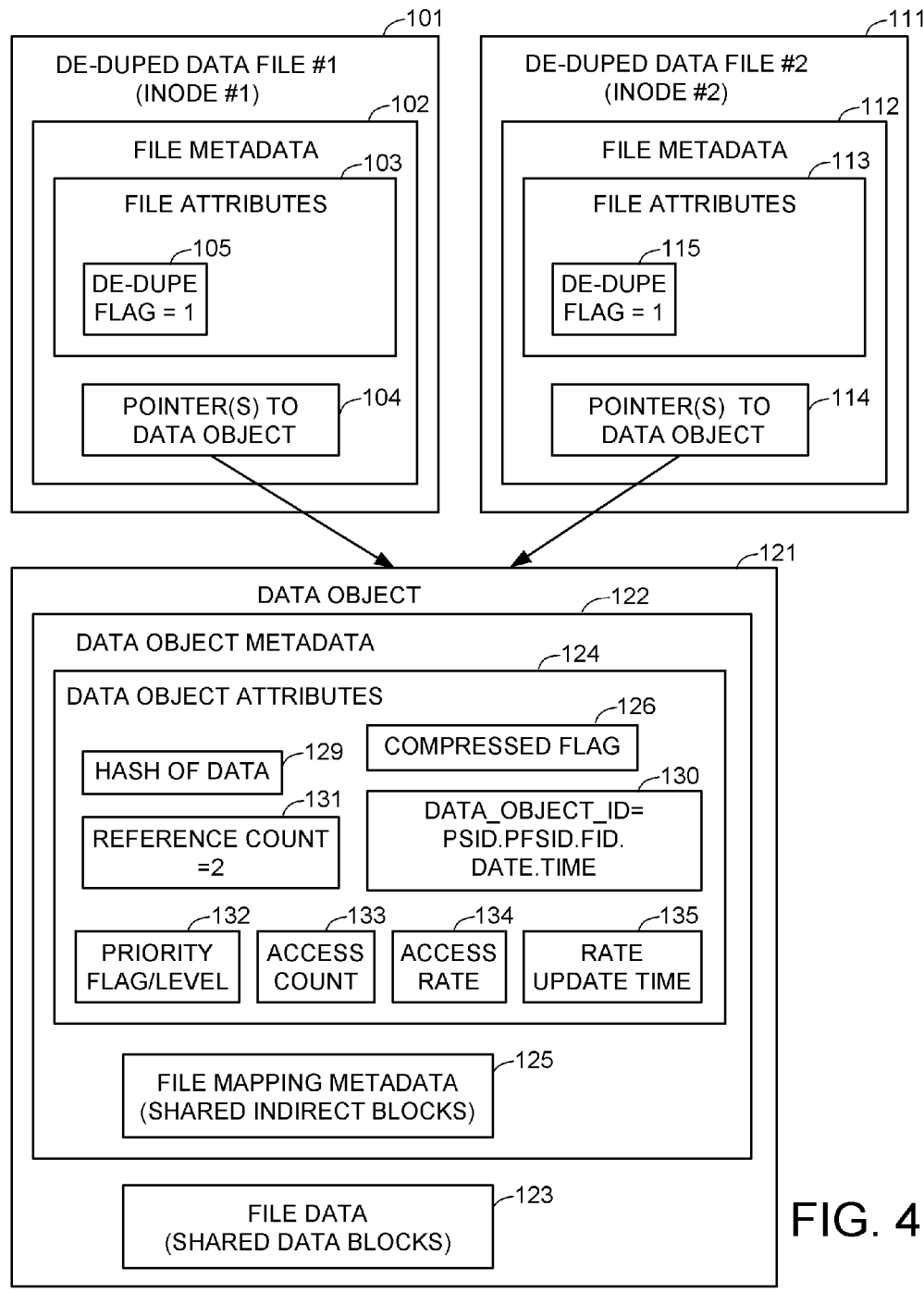
FIG. 4 is a block diagram of two instances of a replicated file, in which each instance has a respective stub inode and the two instances share the same file data.

FIG. 4 shows two de-duped file inodes 101 and 111 sharing a de-duplicated data object 121. In other words, FIG. 4 shows two instances of a deduplicated file, in which each instance has different file attributes but the two instances have the same file data. The file inodes 101 and 111 have a conventional organization for UNIX file inodes. The first file inode 101 includes file metadata 102 including file attributes 103 and at least one pointer 104 to the data object 121. The file attributes 103 include a de-dupe flag 105 set to 1 indicating that the file of the inode 101 has been de-duplicated. In a similar fashion, the second file inode 111 includes file metadata 112 including file attributes 113 and at least one pointer 114 to the data object 121. The file attributes 113 include a de-dupe flag 115 set to 1 indicating that the file of the inode 111 has been de-duplicated.

The data object 121 includes data object metadata 122 and file data 123. The metadata 122 includes data object attributes 124 and file mapping metadata 125. The data object attributes 124 include a flag 126 indicating whether or not the file data is in compressed form, a hash 129 of the data, a data object identifier 130 for the data object, and a reference count 131.

The data object identifier 130 should be unique at least for unique data objects in the file server. Such a unique object identifier can be produced from the attributes of the file from which the data object was first produced in the primary file server. For example, the file from which the data object was produced will have a unique combination of file system identifier (FSID) and file identifier (FID) in the file server when the data object was first produced. The file data associated with this FSID and FID will not change over a relatively short period of time, so that a unique data object identifier in the file server can be produced by combining the FSID and FID with a date-time stamp indicating when the data object was first produced in the primary file server and put in the de-duped object index (51 in FIG. 1). The data object identifier can also be made globally unique in the data network of FIG. 1 by further including a file server identifier (PSID) in the data object identifier. A globally unique data object identifier would be useful for data archiving to aid in disaster recovery. In this case, if the data of a file has been lost or corrupted due to a disaster, the data may be recovered from any archival file copy associated with the same globally unique data object identifier.

In a preferred implementation, the file inodes 101, 111 and the data object 121 are organized so that the file data 123 is accessible in a conventional fashion for a UNIX file. Thus, the pointers 104 and 114 are the block pointers found in conventional inodes. In this case, the data object attributes 124 reside in the de-duped object index (e.g., 51 in FIG. 1). For example, an entry in the de-duped object index for containing the data object attributes is allocated when a source file is de-duplicated and found to contain a unique set of file data, the block pointers in the file inode are copied to this entry, and a pointer to this entry is put in the file attributes of each inode of each instance of the file.

For use by the scrubbing tasks, the data object attributes 124 further include a scrub priority attribute 132, an access count 133, an access rate 134, and a time of last update 135 of the access rate. The scrub priority attribute 132 is a flag set to indicate a high priority for scrubbing, or the priority attribute 132 specifies multiple priority levels for scrubbing. The access count attribute 133 is incremented whenever the data object is accessed for read by an application or process other than a scrubbing task.

Figure 5:
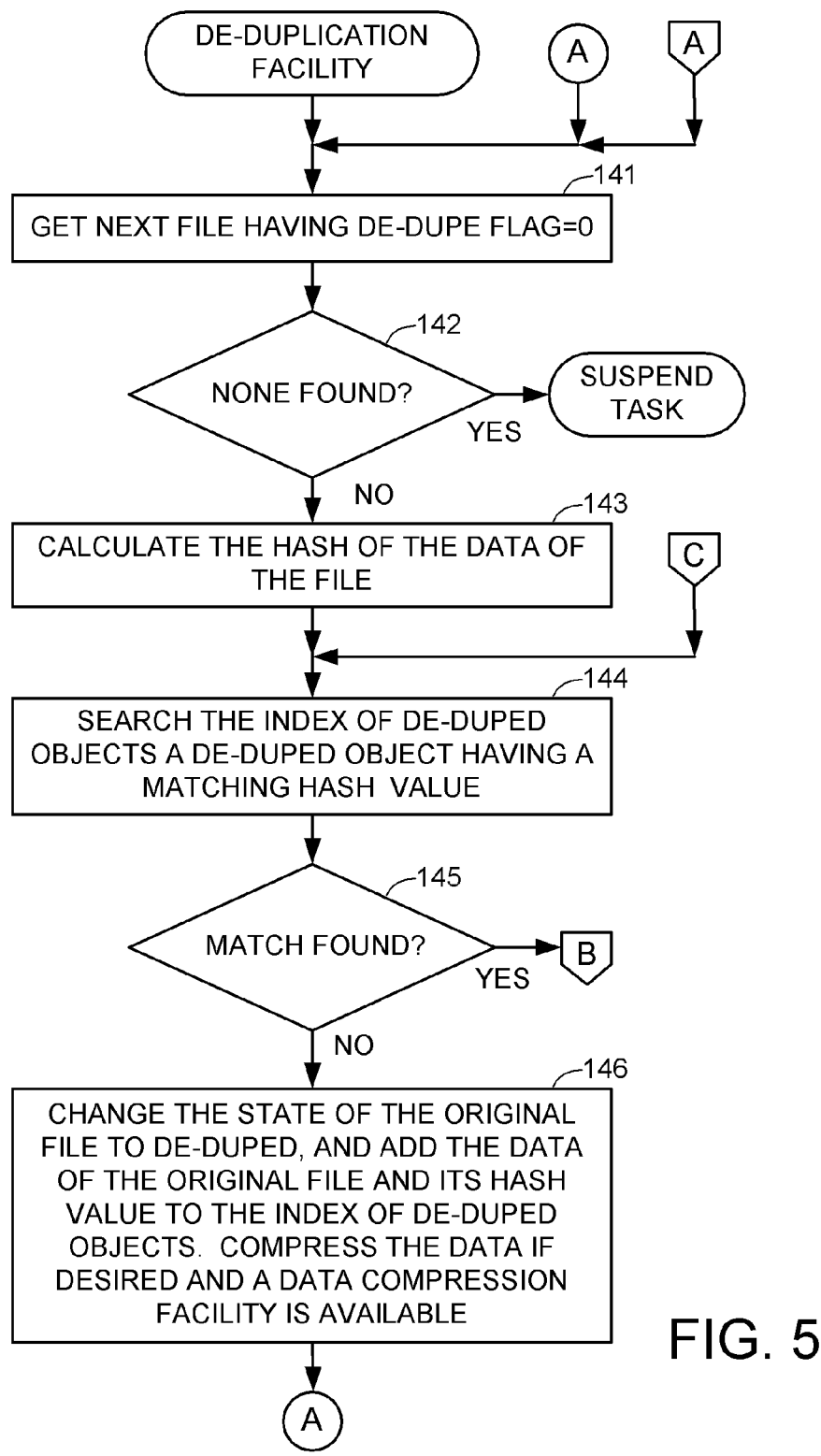
FIGS. 5 and 6 together comprise a flowchart of a deduplication facility in the file server of FIG. 1.
Figure 6:
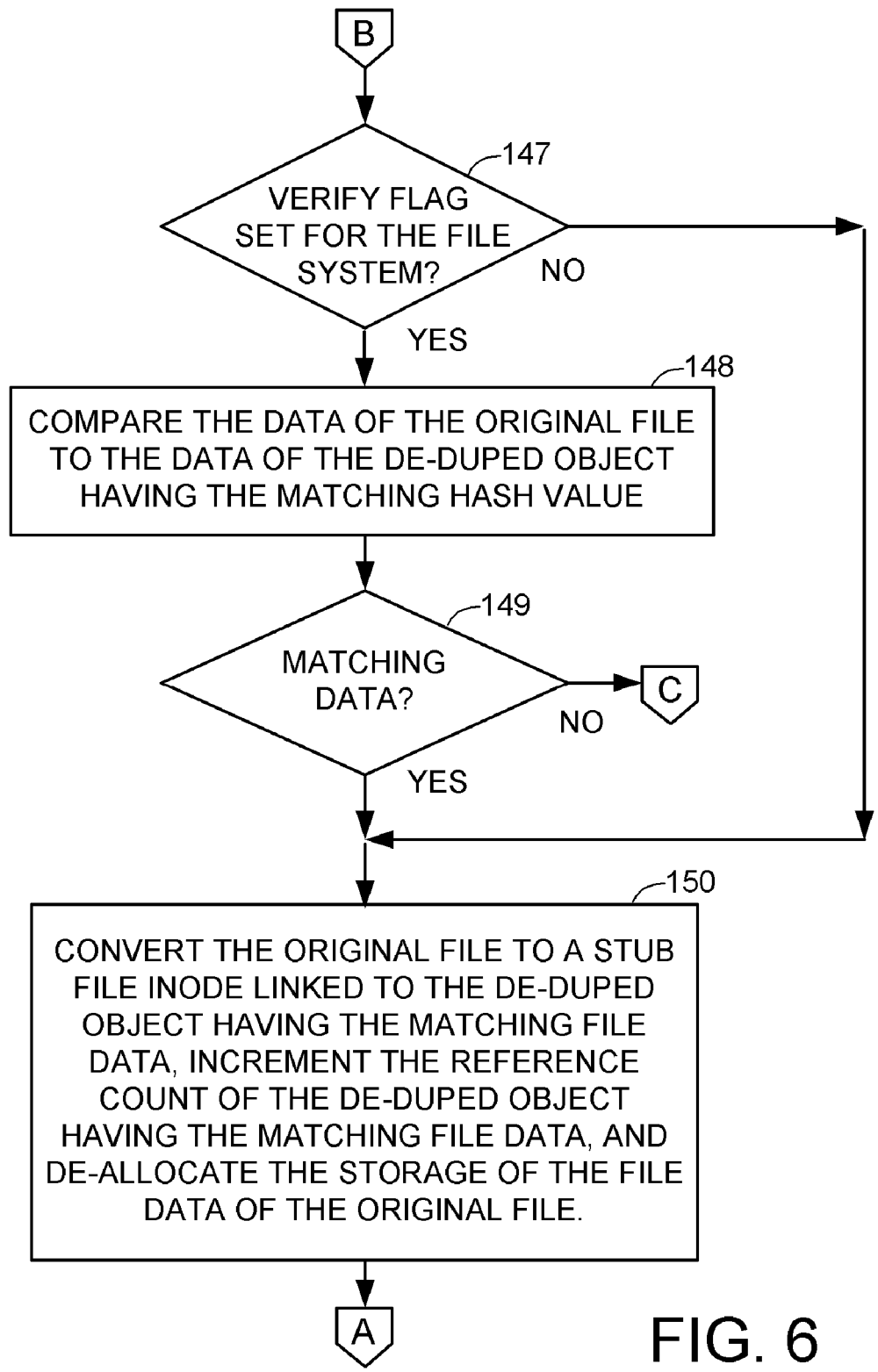

FIGS. 5 and 6 show operation of the de-duplication facility. In a first step 141 of FIG. 5, the data processor searches for a file having it's de-dupe flag set to zero. In step 142, if a file having its de-duplication flag set to zero is not found, then the de-duplication task is suspended. Otherwise, execution continues from step 142 to step 143. In step 143, the data processor calculates the hash of the data of the file. For example, the hash is a checksum of the file data, or the hash is a cryptographic hash of the file data. A suitable cryptographic hash is described in FIPS Publication 198, The Keyed-Hash Message Authentication Code (HMAC), Mar. 6, 2002, National Institute of Standards and Technology, Gaithersburg, Md.

In step 144, the data processor searches the index of de-duped files for a de-duped file having a matching hash value. In step 145, if a match is not found, then in step 146 the state of the original file is changed to de-duped (for example by setting the de-dupe flag to 1), and the original file and its hash value are added to the index of de-duped files. Execution loops from step 146 back to step 141.

In step 145, if a matching hash value is found, then execution branches from step 145 to step 147 in FIG. 6. In step 147, the data processor tests whether or not a "verify flag" has been set for the file system. If so, then execution continues to step 148 to compare the data of the original file to the data of the de-duped file having the matching hash value. In step 149, if the data matches, then execution continues to step 150. In step 150, the data processor converts the original file to a stub file inode linked to the file data blocks of the de-duped file having the matching data. The data processor also increments the reference count of the data object of the de-duped file having the matching file data, and de-allocates the storage of the file data blocks of the original file. Execution loops from step 150 back to step 141 in FIG. 5.

In step 149, if matching data is not found, then execution branches back to step 144 of FIG. 5.

In step 147, if the verify flag is not set for the file system, then execution branches from step 147 to step 150. In this case, a matching hash value is presumed to provide a sufficiently high probability that the file data also matches so that the data of the de-duped file having the matching hash value can be substituted for the data of the original file. For example, the "verify flag" is set for a file system of private critical data, and the "verify flag" is not set for a file system of public read-only data. In addition, for a file system in which the "verify flag" is not set, the hash value of the data object also can be used as the object identifier of the data object.

In the file server 21 of FIG. 1, it is desirable to scrub the deduplicated files 50 in the de-dupe file system 47. This can be done by periodically reading the inodes (101, 111 in FIG. 4) of the files, and reading the deduplicated data objects, which may be shared among the deduplicated files, such as the deduplicated data object 121 shared among the de-duplicated files of the inodes 101 and 111 in FIG. 4.

There are problems with periodic scrubbing of all of the deduplicated data objects in a data duplication store. Depending on the loading of the file server during a typical work week, scrubbing all data periodically with low priority so as not to affect the data injection rates can delay data scrubbing for a single critical data object by multiple days until there a lull in the workload over a weekend. Scrubbing of the deduplicated data objects is especially problematic because each deduplicated data object may or may not be shared by any number of source data objects, and some of the source data objects may or may not be more important or critical than others.

In the file server 21 of FIG. 1, for example, the source data objects are the deduplicated files, and the deduplicated data objects are the data of one or more of the deduplicated files. However, in other storage systems, there could be different kinds of source data objects and deduplicated data objects. For example, instead of just eliminating duplicate files, the deduplication process can be applied a second time to eliminate duplicate file system data blocks from the deduplicated files. Therefore, for the second deduplication process, the source data objects would be the file data of deduplicated files, and the deduplicated data objects would be file system data blocks. Such a second deduplication process would compound the problem of deduplicated data objects being shared by a variable number of source data objects of different importance or criticality.

To address the problem of data scrubbing of the deduplicated data objects, one or more scanning task loops perform priority based data scrubbing in the data duplication store based on one or more attributes of the deduplicated data objects. For example, as shown in FIG. 2, in addition to a background scrub 71 of all deduplicated data objects, there are provided three priority based data scrubbing tasks 72, 73, 74. The task scheduler (66 in FIG. 1) schedules the scanning task loops for execution so that each scanning task loop consumes an allocated percentage of processing time in order to cycle through its scanning loop at a desired rate. Each scanning loop applies a respective pre-programmed condition for enabling priority data scrubbing based on the value of at least one attribute of the de-duplicated data objects. Each condition may encode a particular policy or heuristic for priority data scrubbing of a certain group of deduplicated data objects at a certain rate appropriate for the group.

Figure 7:
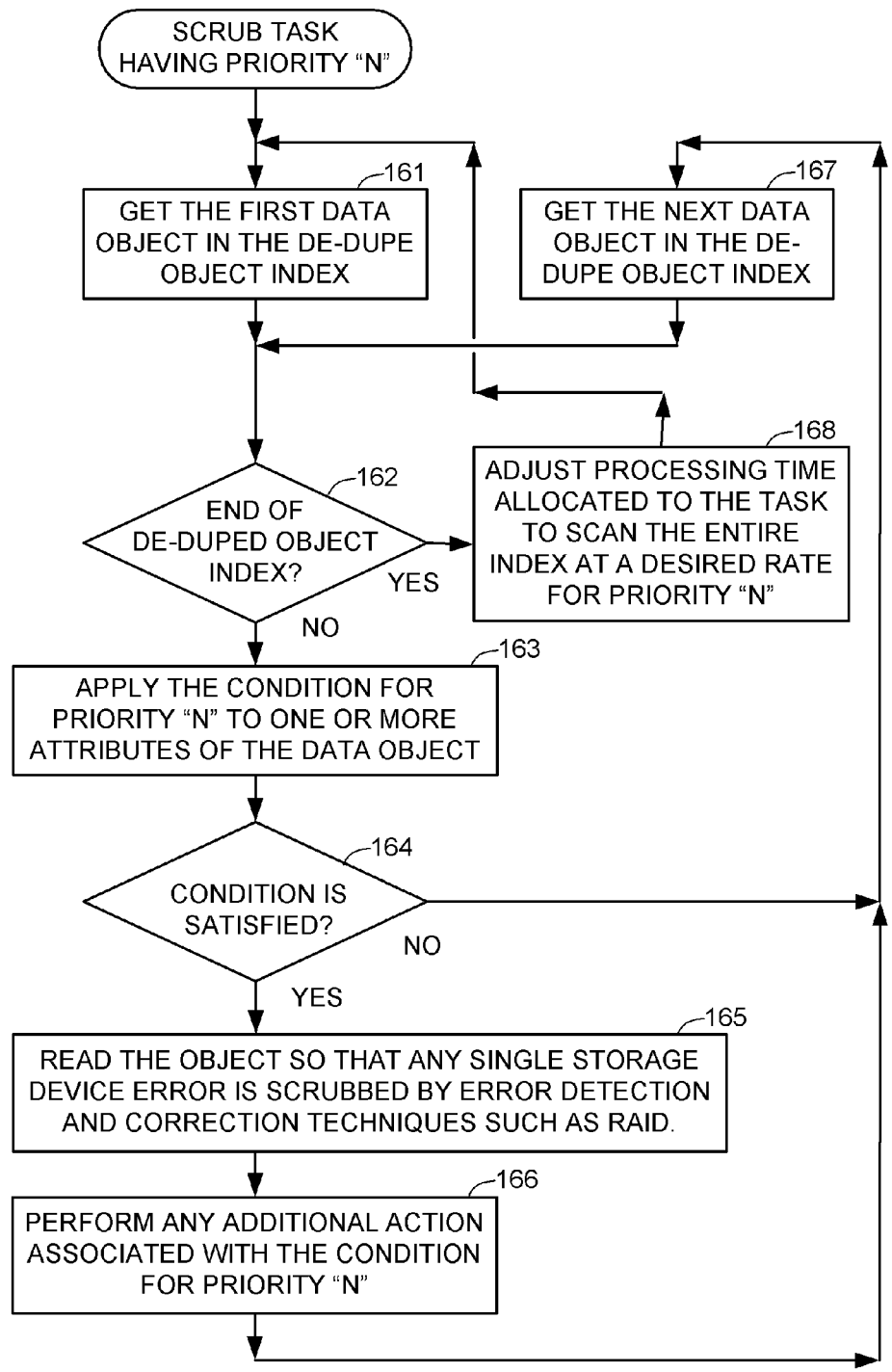
FIG. 7 is a flowchart of a data scrubbing task.

FIG. 7 shows a flowchart of a generic scrubbing task that may be used to perform any one of the more specific priority based data scrubbing tasks 72, 73, 74 by programming of a respective condition for enabling priority data scrubbing (in step 163). In a first step 161 of FIG. 7, the scrub task gets the first data object in the de-dupe object store 47 in FIG. 1). For example, the de-duped object index (51 in FIG. 1) is arranged as a hash index including a hash table of pointers to hash lists, and the first data object is obtained by getting the first pointer from the first entry of the hash table to access the first hash list, and then getting the first data object from the head of the first hash list. Then in step 162, if the end of the de-duped object index has not been reached, then execution continues to step 163.

In step 163, the scrub task applies the respective condition for a given priority "N" to one or more attributes of the deduplicated data object. In step 164, if the condition is satisfied, then execution continues to step 165. In step 165, the scrub task reads the deduplicated data object so that any single storage device error is scrubbed by error detection and correction techniques, such as RAID techniques upon redundant storage devices in the data storage 31. Then, in step 167, the scrub task gets the next data object in the de-dupe object index by advancing to a next data object in the current hash list, or if the end of the current hash list is reached, by accessing the hash table to get the next hash list, and accessing the next hash list to get the next data object from the head of this next hash list. Then execution loops back to step 162 to continue the scanning and scrubbing process. Eventually step 167 reaches the end of the lash hash list, so that step 162 finds that the end of the de-duped object index has been reached, and execution branches from step 162 to step 168. In step 168, the time interval for the last scan through the de-dupe object index is computed (as the difference between the current time and the time of step 161) and this time interval is compared to the time interval for the desired rate. If scanning took too long, then step 168 request the task scheduler (66 in FIG. 1) to increase the processing time allocated to the scrub task, and execution loops back to step 162. If scanning was completed too soon, then step 168 requests the task scheduler to decrease the processing time allocated to the scrub task, and execution is suspended and resumes at the end of the time interval for the desired rate.

Figure 8:
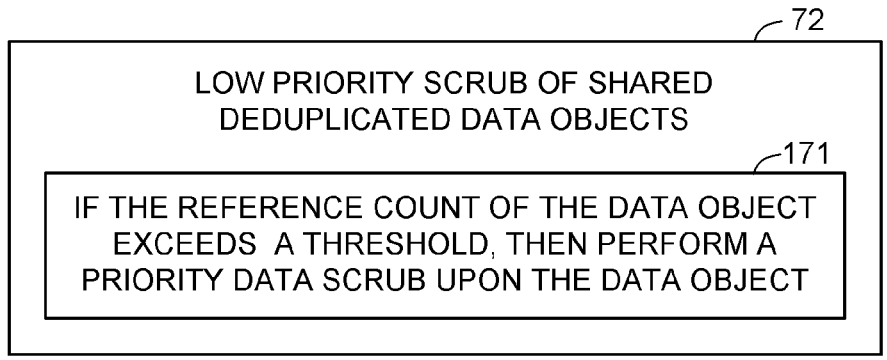
FIG. 8 is a block diagram of the low priority data scrubbing task introduced in FIG. 2.

FIG. 8 shows the respective condition and action 171 (applied in steps 163 to 166 of FIG. 7) for the low priority scrub 72 of shared deduplicated data objects. A conventional deduplicated data store maintains, for each of the deduplicated data objects, an attribute called a reference count (131 in FIG. 4). The reference count indicates how many source data objects share the de-duplicated data object. In a scanning loop (FIG. 7) cycling at a rate appropriate for a certain threshold, if the reference count exceeds the threshold, then priority data scrubbing is performed upon the shared data object. This is one example of a policy for priority data scrubbing encoded in the condition "reference count exceeds the threshold."

Figure 9:
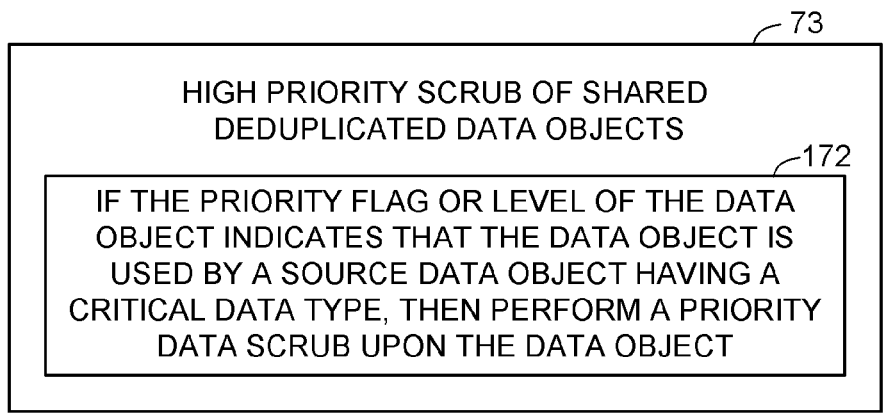
FIG. 9 is a block diagram of a high priority data scrubbing task introduced in FIG. 2.

FIG. 9 shows the respective condition and action 172 (applied in steps 163 to 166 of FIG. 7) for the high priority scrub 73 of shared deduplicated data objects. The deduplicated data store (47 in FIG. 1) maintains a priority attribute (132 in FIG. 4) indicating whether the deduplicated data object (121 in FIG. 4) is used by at least one source data object having a critical data type. In a scanning loop (FIG. 7) cycling at a rate appropriate for a source data object having a critical data type, if the priority attribute of the data object indicates that the data object is used by a source data object having a critical data type, then priority data scrubbing is performed upon the data object. This is another example of a policy for priority data scrubbing encoded in the condition "priority attribute of the data object indicates that the data object is used by a source data object having a critical data type."

For example, the priority attribute (132 in FIG. 4) is a flag that is set when a source data object (e.g., the de-duped data file having the inode 111 in FIG. 4) is ingested into the data store and deduplicated and linked to the deduplicated data object (121 in FIG. 4) by a pointer (114 in FIG. 4) and found to have a critical data type. In another example, as described further below with reference to FIG. 13, there are a number of critical data types, each having a different priority, and when a source data object is ingested into the data store and deduplicated and linked to the deduplicated data object by a pointer and found to have a critical data type, the priority attribute is set to the priority of the critical data type only if the value of the critical data type is greater than the priority already indicated by the priority attribute.

For example, the data type of the source data object is found by inspecting a file extension in the name for the source data object. For example, a file having an extension ".pst" or ".ppt" generated by a finance application indicates a file having a critical data type. Therefore, when such a file is deduplicated and linked to a deduplicated data object, the deduplicated data object is flagged as critical. In a scanning loop cycling at a rate appropriate for such a critical data type, if a deduplicated data object is found to have its priority attribute flag set, then priority data scrubbing is performed on the deduplicated data object. This is an example of a policy for data duplication encoded in the condition "priority attribute flag set."

Figure 10:
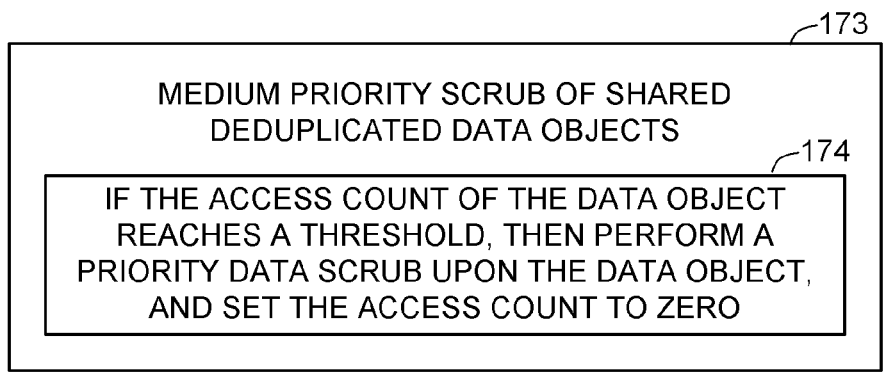
FIG. 10 is a block diagram of a first example of a medium priority data scrubbing task.

FIG. 10 shows the respective condition and action 175 (applied in steps 163 to 166 of FIG. 7) for a medium priority scrub 174 of shared deduplicated data objects. In this example the deduplicated data store maintains, for each of the deduplicated data objects, an access count attribute (133 in FIG. 4) for encoding heuristics into the condition for triggering priority data scrubbing of the deduplicated data object. In this example, the heuristic is that more frequently accessed data is likely to be more valuable than less frequently accessed data. In a scanning loop cycling at a rate appropriate for a certain threshold, if a deduplicated data object is found to have its access count exceeding the threshold, then a priority data scrubbing of the deduplicated data object is performed, and also the access count is set to zero. This is an example of a heuristic for data duplication encoded in the condition "access count exceeds a threshold." This also is an example of a more complex rule having the condition in its premise. The rule has an action to take including a further step ("set access count to zero") in addition to the step of performing priority data scrubbing upon the deduplicated data object.

Figure 11:
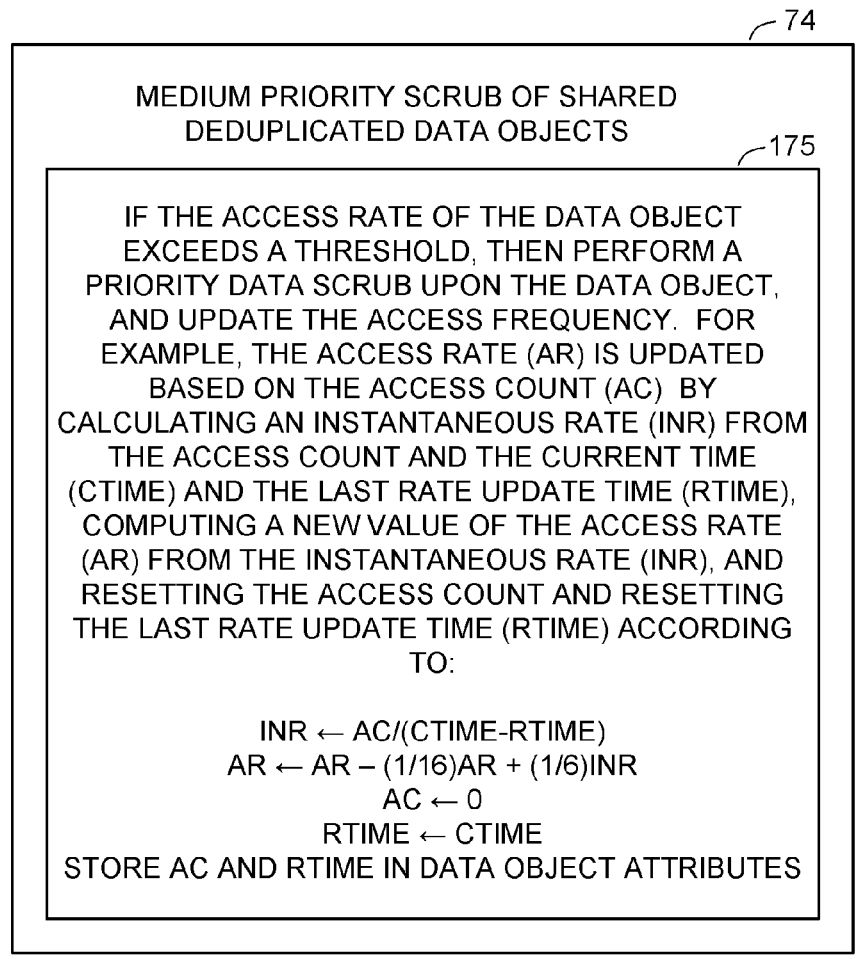
FIG. 11 is a block diagram of a second example of a medium priority data scrubbing task.

FIG. 11 shows the respective condition and action 177 (applied in steps 163 to 166 of FIG. 7) for a preferred medium priority scrub 74 of deduplicated data objects based on access rate. In this example the scanning task computes a more accurate measure of the access rate of each deduplicated data item by further maintaining an "access rate" attribute and a "rate update time" attribute. If the access rate of the data object exceeds a threshold, then the scan task performs a priority data scrub upon the data object, and also updates the access frequency.

For example, a scanning task computes an instantaneous access rate (INR) as the access count (AC) divided by the difference between the current time (CTIME) and the rate update time (RTIIME). The scanning task then computes a new value of the access rate attribute as a weighted average of the old value of the access rate attribute and the instantaneous access rate. Then the scanning task resets the access count to zero. For example, one-sixteenth of the weighted average is due to the value of the instantaneous access rate (INR), so that access rate (AR) is an average over about sixteen scans of the medium priority scrub task 74 over all of the deduplicated data objects. With such a more accurate measure of the access rate, data scrubbing could be triggered by conditions such as "access rate greater than 2 per week."

Figure 12:
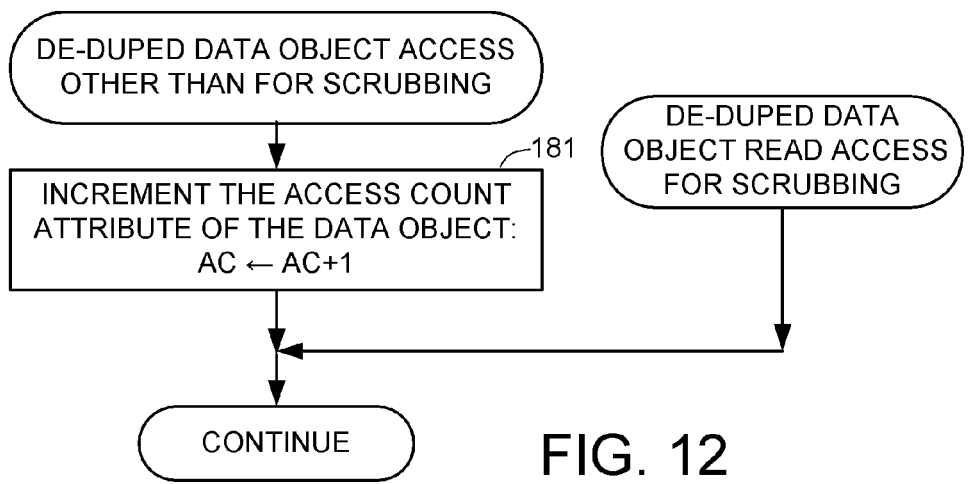
FIG. 12 is a flowchart of access to a de-duplicated data object.

FIG. 12 shows a modification to the de-dupe module (62 in FIG. 1) for maintaining the access count (AC) attribute (133 in FIG. 4) of the data objects. When a deduplicated data object is read or write accessed other than for scrubbing, in step 181 the access count of the data object is incremented by one. For example, step 181 occurs when the file system manager (44 in FIG. 1) receives a read or write request from one of the clients 22, 23 and determines that the client is requesting access to a file in the de-dupe file system 47, and therefore invokes the de-dupe module (62 in FIG. 1) to read or write to the file. When a scrubbing task reads a data object, step 181 is skipped.

Figure 13:
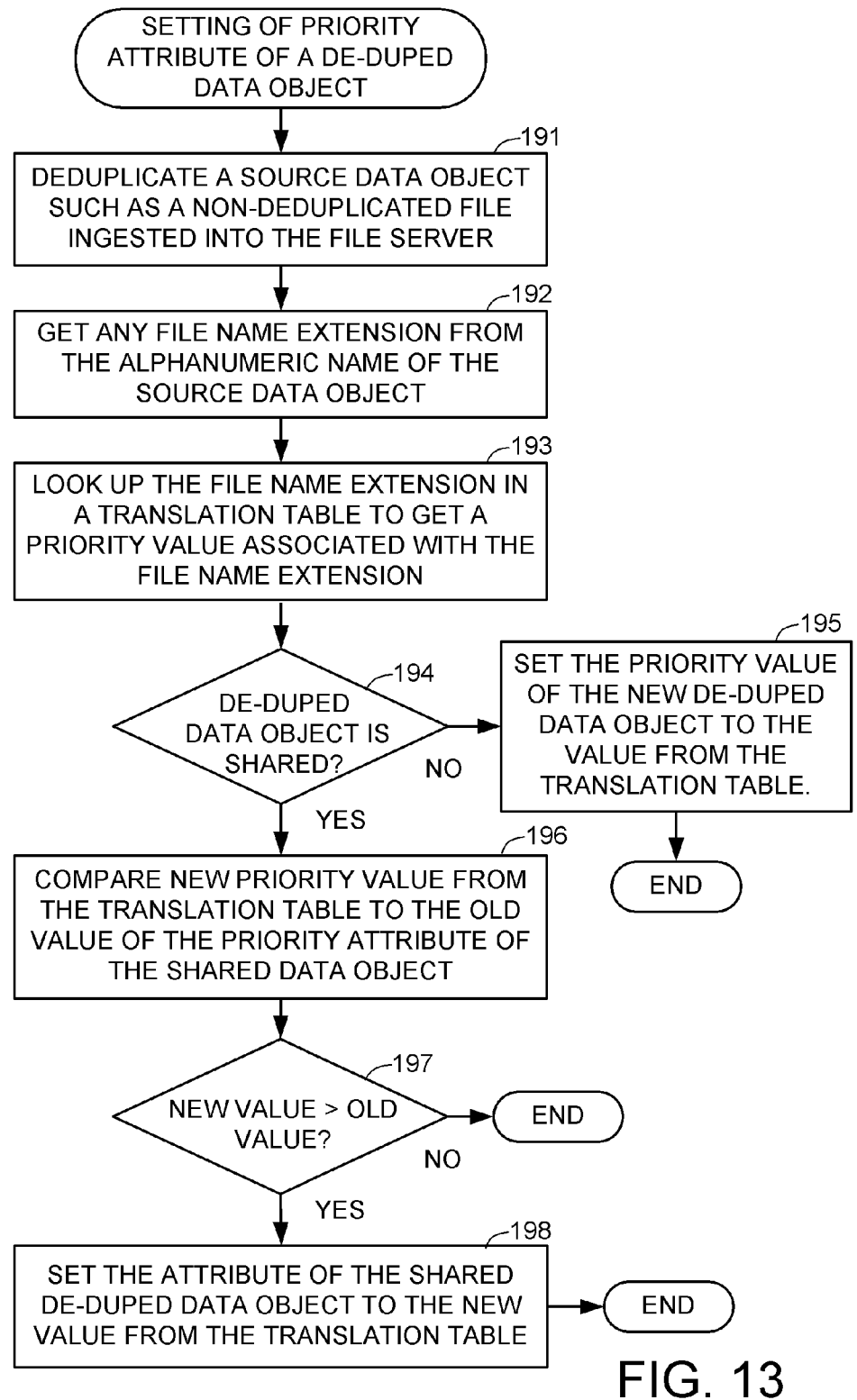
FIG. 13 is a flowchart of setting of a priority attribute of a de-duplicated data object.

FIG. 13 shows a modification to the de-dupe module (62 in FIG. 1) for maintaining the priority attribute (132 in FIG. 4) of the data objects. In step 191, a source data object is deduplicated, such as when a non-deduplicated file is ingested into the file server. Then in step 192, any file name extension is obtained from the alphanumeric name of the source data object. In step 193, file name extension is used as a key to look up an associated priority value in a translation table. In step 194, if the associated deduplicated data object (pointed to for the source data object that was deduplicated in step 191) is not shared with another source data object, then execution branches to step 195 to set the priority value of the new de-duped data object to the value from the translation table, so that the routine of FIG. 13 is finished.

In step 194, if the associated deduplicated data object is shared, then execution continues from step 194 to step 196. In step 196, the new priority value from the translation table is compared to the old value of the priority attribute of the shared data object. For example, a priority flag that is set indicates a higher priority than a priority flag that is not set. In step 197, if the new value is not greater than the old value, then the routine of FIG. 13 is finished. Otherwise execution continues from step 197 to step 198 to set the attribute of the shared deduplicated data object to the new value from the translation table.

In view of the above, deduplicated data objects are scrubbed by executing a priority scrubbing task that scans the deduplicated data objects and applies a condition that enables priority data scrubbing based on the value of at least one attribute of the de-duplicated data objects. For example, a low priority task scrubs a deduplicated data object when a reference count of the deduplicated object reaches a threshold. A high priority task scrubs a deduplicated data object when a priority attribute indicates that the deduplicated data object is used by a critical source data object. A medium priority task scrubs a deduplicated data object when the access frequency of the deduplicated data object reaches a threshold. The condition may encode a scrubbing policy or heuristic, and may trigger further action in addition to scrubbing, such as triggering an update of the access rate. The priority based data scrubbing is a proactive approach that provides value for business by earlier failure detection and correction and by resource savings for the data scrubbing. Only the critical data, which may not be more than about 10 to 20%, need be scrubbed on a priority basis, and the less valuable data can be scrubbed rarely or not at all.

What is claimed is:

1. A computer-implemented method of ensuring access to data stored in a deduplicated data store, the deduplicated data store including data storage storing deduplicated data objects and pointers to the deduplicated data objects from source data objects for sharing of the deduplicated data objects among the source data objects, the data storage also storing attributes of the deduplicated data objects, the method comprising a data processor executing computer instructions stored on a non-transitory computer-readable storage medium to perform the steps of:
    (a) programming the data processor with a condition for enabling priority data scrubbing based on the value of at least one attribute of the de-duplicated data objects; and
    (b) scanning the stored attributes of the deduplicated data objects while applying the condition to the value of said at least one attribute for each of the deduplicated data objects, and when the scanning of the stored attributes finds that the condition is satisfied for the value of said at least one attribute of at least one of the deduplicated data objects, performing a priority data scrubbing operation upon said at least one of the deduplicated data objects;
    wherein the value of said at least one attribute of said at least one of the deduplicated data objects is a reference count indicating how many of the source data objects share said at least one of the deduplicated data objects, and the applying of the condition to the value of said at least one attribute for each of the deduplicated data objects compares the value of said at least one attribute for each of the deduplicated data objects to a threshold.

2. A storage system comprising:
    a deduplicated data store including data storage storing deduplicated data objects and pointers to the deduplicated data objects for source data objects for sharing of the deduplicated data objects among the source data objects, the data storage also storing attributes of the deduplicated data objects,
    a data processor coupled to the data storage for reading the deduplicated data objects and reading the attributes of the deduplicated data objects, and
    a non-transitory computer-readable storage medium storing computer instructions that, when executed by the data processor, perform the steps of:
    (a) programming the data processor with a condition for enabling priority data scrubbing based on the value of at least one attribute of the de-duplicated data objects; and
    (b) scanning the stored attributes of the deduplicated data objects while applying the condition to the value of said at least one attribute for each of the deduplicated data objects, and when the scanning of the stored attributes finds that the condition is satisfied for the value of said at least one attribute of at least one of the deduplicated data objects, performing a priority data scrubbing operation upon said at least one of the deduplicated data objects;
    wherein the value of said at least one attribute of said at least one of the deduplicated data objects is a reference count indicating how many of the source data objects share said at least one of the deduplicated data objects, and the applying of the condition to the value of said at least one attribute for each of the deduplicated data objects compares the value of said at least one attribute for each of the deduplicated data objects to a threshold.

3. A non-transitory computer-readable storage medium storing computer instructions that, when executed by a data processor, perform data scrubbing of deduplicated data objects in a data store by the steps of:
    (a) programming the data processor with a condition for enabling priority data scrubbing based on the value of at least one attribute of the de-duplicated data objects; and
    (b) scanning stored attributes of the deduplicated data objects while applying the condition to the value of said at least one attribute for each of the deduplicated data objects, and when the scanning of the stored attributes finds that the condition is satisfied for the value of said at least one attribute of at least one of the deduplicated data objects, performing a priority data scrubbing operation upon said at least one of the deduplicated data objects;
    wherein the value of said at least one attribute of said at least one of the deduplicated data objects is a reference count indicating how many source data objects share said at least one of the deduplicated data objects, and the applying of the condition to the value of said at least one attribute for each of the deduplicated data objects compares the value of said at least one attribute for each of the deduplicated data objects to a threshold.

* * * * *